United States Patent
Kim et al.

(10) Patent No.: US 8,493,831 B2
(45) Date of Patent: Jul. 23, 2013

(54) COMPATIBLE OPTICAL PICKUP AND OPTICAL RECORDING AND/OR REPRODUCING APPARATUS EMPLOYING THE SAME

(75) Inventors: Ui-yol Kim, Suwon-Si (KR); Tae-kyung Kim, Seoul (KR); Chong-sam Chung, Hwaseong-si (KR); Pyong-yong Seong, Seoul (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 2934 days.

(21) Appl. No.: 10/897,015

(22) Filed: Jul. 23, 2004

(65) Prior Publication Data
US 2005/0018560 A1 Jan. 27, 2005

(30) Foreign Application Priority Data
Jul. 25, 2003 (KR) .................. 10-2003-0051635

(51) Int. Cl.
*G11B 7/00* (2006.01)
(52) U.S. Cl.
USPC ............ 369/112.05; 369/112.02; 369/112.23; 369/44.37
(58) Field of Classification Search
USPC .... 369/44.37, 44.23, 112.02, 112.05–112.07, 369/112.16, 112.23, 112.25, 94
See application file for complete search history.

(56) References Cited

U.S. PATENT DOCUMENTS

| | | | |
|---|---|---|---|
| 6,222,812 B1 * | 4/2001 | Yoo et al. | 369/112.26 |
| 6,449,095 B1 * | 9/2002 | Ohtaki et al. | 359/566 |
| 7,075,865 B2 * | 7/2006 | Nishioka et al. | 369/112.01 |
| 7,245,407 B2 * | 7/2007 | Komma | 369/112.05 |
| 7,248,409 B2 * | 7/2007 | Komma et al. | 369/112.08 |
| 7,260,047 B2 * | 8/2007 | Nishioka et al. | 369/112.05 |

FOREIGN PATENT DOCUMENTS

| | | |
|---|---|---|
| JP | 2001-60336 | 3/2001 |
| JP | 2001-93179 | 4/2001 |
| JP | 2001-093179 | 4/2001 |
| JP | 2001-209966 | 8/2001 |
| JP | 2002-298422 | 10/2002 |
| KR | 2003-0023312 | 3/2003 |

OTHER PUBLICATIONS

Notice to Submit Response issued by the Korean Intellectual Property Office on May 30, 2005 in Application No. 10-2003-0051635.

* cited by examiner

*Primary Examiner* — Thang Tran
(74) *Attorney, Agent, or Firm* — Staas & Halsey LLP

(57) ABSTRACT

A compatible optical pickup including an optical unit and a focusing unit. The optical unit emits a short wavelength light for high-density recording media and a long wavelength light for low-density recording media, directs the short and long wavelength light to a recording medium, receives lights reflected by the recording medium, and detects an information reproduction signal and/or an error signal from the received lights. The focusing unit focuses light received from the optical unit to form a light spot on a recording surface of the recording medium, diffracts the short wavelength light into a zero order light and the long wavelength light into a second order light to be used as effective light for recording and/or reproduction. Thus, a high-density recording medium and a low-density recording medium having different thicknesses can be compatibly used.

26 Claims, 7 Drawing Sheets

COMPATIBLE OPTICAL PICKUP AND OPTICAL RECORDING AND/OR REPRODUCING APPARATUS EMPLOYING THE SAME

CROSS-REFERENCE TO RELATED APPLICATION

This application claims the benefit of Korean Patent Application No. 2003-51635, filed on Jul. 25, 2003 in the Korean Intellectual Property Office, the disclosure of which is incorporated herein in its entirety by reference.

BACKGROUND OF THE INVENTION

1. Field of the Invention

The present invention relates to an optical recording and/or reproducing apparatus, and more particularly, to a compatible optical pickup capable of compatibly adopting a high-density recording medium, which uses a blue light, and a low-density recording medium having a lower recording density than the high-density recording medium, and an optical recording and/or reproducing apparatus adopting the compatible optical pickup.

2. Description of the Related Art

Optical recording and/or reproducing apparatuses record information in or reproduce information from a disc-type recording medium using a light spot focused by an objective lens. In optical recording and/or reproducing apparatuses, a recording capacity depends on a size of the light spot. The size (S) of the light spot is determined depending on a wavelength ($\lambda$) of light and a numerical aperture (NA) of an objective lens as expressed in Equation 1:

$$S \propto \lambda/NA \quad (1)$$

As shown in Equation 1, the size of the light spot depends on the wavelength of light used and the numerical aperture of the objective lens.

Since CDs on and/or from which information can be recorded and/or reproduced using light with a 780 nm wavelength and an objective lens having a numerical aperture of 0.45 or 0.5 emerged, many lines of research into an improved information storage medium with an increased information storage capacity by increasing a recording density have been made. This research resulted in digital versatile discs (DVDs), on and/or from which information is recorded and/or reproduced using light with a 650 nm wavelength and an objective lens with a numerical aperture of 0.6 or 0.65.

At present, additional research into high-density recording media providing a recording capacity of 20 GB or greater using light with a blue wavelength, e.g., a 405 nm wavelength, have been made steadily.

High-density recording media are actively under standardization, and standardization of some of the high-density recording media is nearly completed. The high-density recording media uses light with a blue wavelength, e.g., a 405 nm wavelength. An objective lens used for the high-density recording media has a numerical aperture of 0.65 or 0.85.

CDs have thicknesses of 1.2 mm, and DVDs have thicknesses of 0.6 mm. The reason why DVDs have thicknesses of 0.6 mm smaller than 1.2 mm is to secure a tolerance caused by the tilt of a recording medium, because DVDs have numerical apertures of about 0.6, which is greater than a 0.45 numerical aperture of CDs.

When a tilt angle of a recording medium is $\theta$, a refractive index of the recording medium is n, a thickness of the recording medium is d, and a numerical aperture of the recording medium is NA, a coma aberration $W_{31}$ generated by a tilt of the recording medium may be expressed in Equation 2:

$$W_{31} = \frac{d}{2} \frac{n^2(n^2-1)\sin\theta\cos\theta}{(n^2-\sin^2\theta)^{5/2}} NA^3 \quad (2)$$

wherein the refractive index (n) and thickness (d) of the recording medium denote a refractive index and a thickness of an optical medium that ranges from a light incidence surface to a recording surface, respectively.

Considering Equation 2, when a numerical aperture of an objective lens is increased to achieve high-density recording, the thickness of a recording medium should be reduced to secure a tolerance generated due to a tilt of the recording medium.

Hence, when the numerical aperture of the objective lens is increased to 0.85 to deal with a high-density recording medium, the thickness of the high-density recording medium should be about 0.1 mm. The high-density recording medium, which requires an objective lens with a high numerical aperture and has a thin thickness, is a Blu-ray disc (hereinafter, referred to as a BD). In the specification of a BD, a wavelength of a light source is 405 nm, a numerical aperture of an objective lens is 0.85, and a thickness of the BD is about 0.1 mm. The thickness of a recording medium denotes a distance between a surface of the recording medium on which light for recording and/or reproduction is incident and a recording surface of the recording medium.

Examples of a high-density recording medium include a BD and an advanced optical disc (AOD). An AOD uses a light source with a 405 nm light source and an objective lens with a 0.65 numerical aperture and has a thickness of 0.6 mm corresponding to the thickness of a DVD. BDs have higher recording densities than those of AODs.

Since a reflective ratio of a DVD-R, which is an example of an existing recording medium, significantly decreases depending on a wavelength of light, a light source with a 650 nm wavelength must be used.

Hence, to compatibly use both a high-density recording medium, (e.g., a BD), and a low-density recording medium, (e.g., a DVD), an optical recording and/or reproducing apparatus for high-density recording media generally uses an optical pickup having a separate optical system for high-density recording media and a separate optical system for low-density recording media, in consideration of both a spherical aberration generated due to a difference between thicknesses of recording media and numerical apertures required for recording media with different formats.

In other words, an optical pickup for high-density recording media generally has an optical system that uses both an objective lens for high-density recording media and an objective lens for low-density recording media. Also, considering the compatibility with DVD-R, the optical pickup for high-density recording media uses at least two light sources emitting beams with different wavelengths.

As described above, an optical pickup for high-density recording media should include at least two objective lenses to compatibly employ both high-density recording media and low-density recording media, for example, BDs and DVDs. In this case, the objective lenses maybe tilted toward each other due to an assembly causing performance degradation.

In other words, an objective lens for high-density recording media (i.e., BDs) and an objective lens for low-density recording media (i.e., DVDs) are generally mounted on a single lens holder such that the two objective lens are in focusing and tracking directions by a single actuator.

In such a system having two objective lenses, when a tilt between the two objective lenses occurs, an optical axis of one of the two objective lenses may be adjusted to be perpendicular to a recording medium using skew adjustment. However, the other objective lens is tilted with respect to the recording medium. Consequently, because features of an optical system, such as a light spot skew, should be adjusted as much as possible to an objective lens for BDs, features of an optical system for DVDs may be degraded.

Also, when an optical system for high-density recording media and an optical system for low-density recording media are separately installed in an optical system as described above, an optical system of the optical pickup is very complex, and a large number of optical components are required. Such a complicated optical system causes an increase in the material cost, a decrease in the reliability, and a degradation of the performance of the assembly and adjustment. The reliability decrease is due to deviation of the optical components during an operation at a high temperature. As the number of optical components increases, the number of points on which the optical components are attached to a base frame using an adhesive also increases. Hence, during a high-temperature operation, the probability that the optical components are deviated increases, and the degree of distortion of the entire optical system becomes severe. Further, as the number of optical components increases, an assembling error during assembly increases.

SUMMARY OF THE INVENTION

The present invention provides in accordance with an aspect of the present invention, a compatible optical pickup capable of recording data on and/or from both a high-density recording medium, which uses a blue light, and a low-density recording medium, such as a DVD, having a lower recording density than the high-density recording medium using a single objective lens, and an optical recording and/or reproducing apparatus adopting the compatible optical pickup.

Additional aspects and/or advantages of the invention will be set forth in part in the description which follows and, in part, will be obvious from the description, or may be learned by practice of the invention.

According to an aspect of the present invention, there is provided a compatible optical pickup including an optical unit and a focusing unit. The optical unit emits a short wavelength light for high-density recording media and a long wavelength light for low-density recording media, which has a longer wavelength than the short wavelength light, directs the short and long wavelength light to a recording medium, receiving lights reflected by the recording medium, and detects an information reproduction signal and/or an error signal from the received lights. The focusing unit focuses light received from the optical unit to form a light spot on a recording surface of the recording medium and diffracts the short wavelength light into a zero order light and the long wavelength light into a second order light to be used as effective light for recording and/or reproduction so that a high-density recording medium and a low-density recording medium having different thicknesses can be compatibly used.

In an aspect of the present invention, the focusing unit includes: an objective lens optimized for the high-density recording media, focusing the light received from the optical unit to form the light spot on the recording surface of the recording medium; and a hologram element diffracting the short wavelength light into the zero order light and the long wavelength light into the second order light. According to an aspect, the hologram element may be combined with an objective lens into a single body.

According to an aspect of the present invention, the focusing unit includes an objective lens optimized for the high-density recording media. The objective lens has a hologram pattern formed on one lens surface to diffract the short wavelength light of the light received from the optical unit into the zero order light and the long wavelength light into the second order light and focuses the light received from the optical unit to form the light spot on the recording surface of the recording medium.

According to an aspect of the present invention, the short wavelength light is a blue light, and the long wavelength light is a red light.

According to an aspect of the present invention, the high-density recording medium includes a blu-ray disc, and the low-density recording medium is a digital versatile disc.

According to an aspect of the present invention, the blue light has a wavelength ranging from 400 to 420 nm, and wherein the red light has a wavelength ranging from 645 to 670 nm.

According to an aspect of the present invention, the optical unit includes: a light source emitting the blue light; a photodetector receiving a blue light reflected by the recording medium and detecting an information reproduction signal and/or the error signal associated with the high-density recording medium from the received blue light; and a hologram optical module emitting the red light, receiving a red light reflected by the recording medium, and detecting an information reproduction signal and/or the error signal associated with the low-density recording medium from the received red light.

According to an aspect of the present invention, the optical unit further includes a polarization-dependent light path changer transmitting or reflecting the blue light according to a polarization state; and a wave plate changing a polarization of an incident light.

According to an aspect of the present invention, the compatible optical pickup further includes a liquid crystal element, which is installed on a light path between the polarization-dependent light path changer and the wave plate and compensates for a spherical aberration generated due to a thickness difference when data is recorded in or reproduced from the high-density recording medium.

According to an aspect of the present invention, the high-density recording medium has a plurality of recording layers in at least one side. When a recording layer of the high-density recording medium having a thickness deviating from a design value is recorded or reproduced, the liquid crystal element operates to compensate for the spherical aberration caused due to the thickness difference.

According to another aspect of the present invention, there is provided an optical recording and/or reproducing apparatus for recording information in and/or reproducing information from a high-density recording medium and at least one low-density recording medium by using an optical pickup installed movably in a radial direction of a recording medium. The optical pickup includes an optical unit and a focusing unit. The optical unit emits a short wavelength light for high-density recording media and a long wavelength light for low-density recording media, which has a longer wavelength than the short wavelength light, directs the short and long wavelength light to the recording medium, receiving lights reflected by the recording medium, and detects an information reproduction signal and/or an error signal from the received lights. The focusing unit focuses light received from the optical unit to form a light spot on a recording surface of the recording medium and diffracts the short wavelength light into a zero order light and the long wavelength light into a second order light to be used as effective light for recording and/or reproduction so that a high-density recording medium and a low-density recording medium having different thicknesses can be compatibly used.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE EMBODIMENTS

Figure 1:
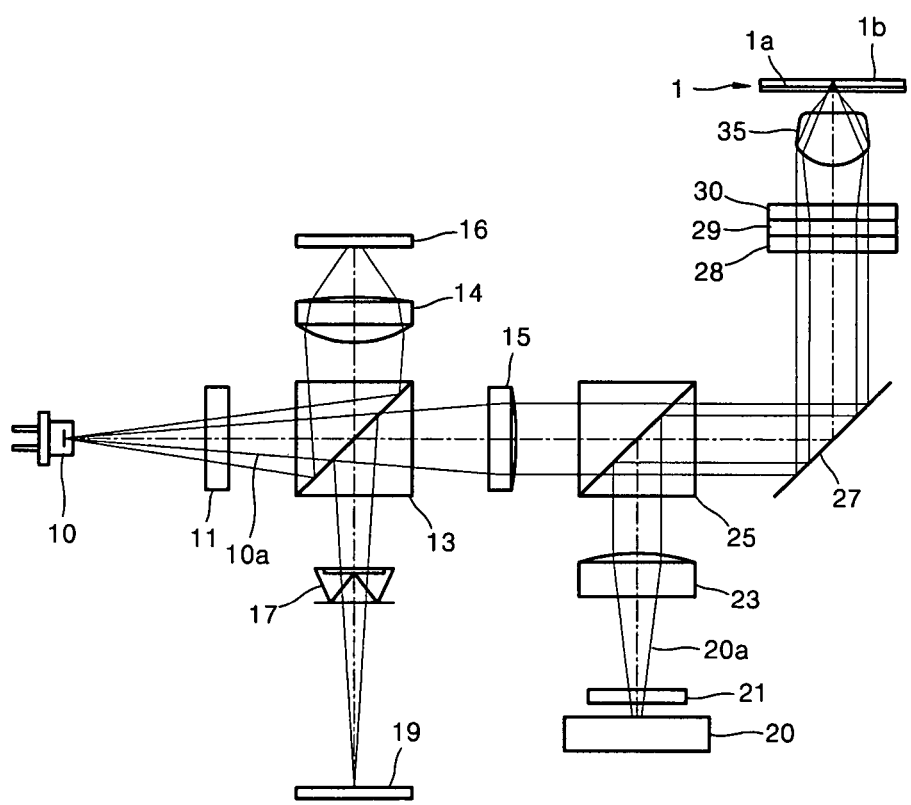
FIG. 1 illustrates an optical structure of a compatible optical pickup according to an embodiment of the present invention.

Reference will now be made in detail to the embodiments of the present invention, examples of which are illustrated in the accompanying drawings, wherein like/reference numerals refer to the like elements throughout. The embodiments are described below to explain the present invention by referring to the figures.

The present invention provides a compatible optical pickup which can compatibly adopt high-density recording media and at least one low-density recording medium which have different thicknesses. The optical pickup includes an optical unit and a focusing unit.

The optical unit includes optical components which emit a short-wavelength light for high-density recording media and a long-wavelength light for low-density recording media toward a recording medium and which receives light reflected from the recording medium to detect an information reproduction signal and/or an error signal. The wavelength of the light for low-density recording media is longer than that of the light for high-density recording media.

The focusing unit includes optical components which focus light received from the optical unit to form a light spot on a recording surface of the recording medium and which diffract the received light according to a wavelength so that a zero order light of the short-wavelength light and a second order light of the long-wavelength light are used as effective light for recording and/or reproduction.

In an aspect of the compatible optical pickup, the short-wavelength light is a blue light, and the high-density recording media are reproducible and/or recordable blu-ray discs (BDs), which use a blue light and have storage capacities of 20 GB or greater and thicknesses different from those of DVDs. Also, the long-wavelength light is a red light, and the low-density recording medium is at least one of a DVD-family recording medium including a DVD-ROM, a DVD-R, a DVD±RW, and a DVD-RAM.

When the low-density recording medium is a DVD, the high-density recording media are high-density recording medium having thicknesses smaller than a thickness of the DVD, for example, BDs. As described above, a BD uses a light source with a 405 nm wavelength and an objective lens with a numerical aperture of 0.85 and has a thickness of about 0.1 mm.

The high-density recording media may be a recording medium following a well-known BD specification or any recording media as long as they have a smaller thickness than DVDs and use a light with a shorter wavelength than a red light for DVDs.

A compatible optical pickup according to an embodiment of the present invention capable of compatibly adopting DVDs and BDs, which have smaller thicknesses and larger storage capacities than the DVDs and use a blue light, will now be described with reference to the accompanying drawings. The invention should, however, not be construed as being limited to the BD-DVD compatible optical pickup of the aforementioned embodiment; rather, these embodiments are provided so that this disclosure will be thorough and complete, and will fully convey the concept of the invention to those skilled in the art. In other words, it is understood that the invention may be embodied in many different forms as long as they can compatibly adopt high-density recording media and low-density recording media having different thicknesses and different recording densities while using a single objective lens.

FIG. 1 illustrates an optical structure of a compatible optical pickup according to an embodiment of the present invention. Referring to FIG. 1, the compatible optical pickup includes a light source 10, a photodetector 19, a hologram optical module 20 for a low-density recording medium 1b, an objective lens 35, and a hologram element 30. The light source 10 emits a short wavelength light, for example, a blue light 10a. The photodetector 19 receives the blue light 10a reflected by a recording medium 1 and detects an information reproduction signal for and/or an error signal for a high-density recording medium 1a. The objective lens 35 focuses light to form a light spot on a recording surface of the recording medium 1. The hologram element 30 diffracts the blue light 10a into a zero order light and a long wavelength light, for example, a red light 20a, into a second order light. The objective lens 35 and the hologram element 30 belong to a focusing unit, and the remaining elements belong to an optical unit.

The optical structure of the optical unit of FIG. 1 is just an example and may be changed in many different forms aspects which still contribute to compatible use of the high-density recording medium 1a and the low-density recording medium 1b by the use of a short-wavelength light for the medium 1a and a long-wavelength light for the medium 1b.

The light source 10 is used to record information in and/or reproduce information from the high-density recording medium 1a, for example, a BD. Preferably, the light source 10 emits the blue light 10a with a wavelength of 400 to 420 nm.

In an aspect of the present invention, a DVD hologram optical module is used as the hologram optical module 20. In other words, the hologram optical module 20 emits the red light 20a and receives the red light 20a reflected by the recording medium 1 to detect an information reproduction signal and/or an error signal for the low-density recording medium 1b.

The hologram optical module 20 may include a light source (not shown) which emits the red light 20a, a photodetector (not shown) which receives the red light 20a reflected by the recording medium 1 and detects the information reproduction signal for and/or the error signal for the low-density recording medium 1b, and the hologram element (not shown) which transmits the red light 20a emitted from the red light source (i.e., diffracts the red light 20a into a zero order light) and diffracts the red light 20a reflected by the recording medium 1 into a +first or −first order light so that the diffracted red lights 20a are directed toward the photodetector. Since the structure of the hologram optical module 20 is well known in the technical field of the present invention, these individual elements will not be shown. Preferably, the hologram optical module 20 emits a red light 20a with a wavelength of 645 to 670 nm.

The compatible optical pickup of FIG. 1 further includes a polarization beam splitter 13, which is a polarization-dependent light path changer, and a wave plate 29 to maintain a high efficiency in a recording optical system. The polarization beam splitter 13 changes the path of the blue light 10a according to polarization, and the wave plate 29 changes a polarization of incident light. The compatible optical pickup of FIG. 1 further includes a beam splitter 25, which transmits the blue light 10a passed through the polarization beam splitter 13 and reflects the red light 20a emitted from the hologram optical module 20 so that the blue and red lights 10a and 20a are directed toward the objective lens 35 along a single path.

When the compatible optical pickup of FIG. 1 further includes a liquid crystal element 28 for correcting a spherical aberration as will be described later, the wave plate 29 is preferably, disposed between the liquid crystal element 28 and the objective lens 35.

The polarization beam splitter 13 transmits or reflects incident blue light 10a according to a polarization. For example, the polarization beam splitter 13 transmits the blue light 10a received from the light source 10 toward the objective lens 35 and reflects the blue light 10a reflected by the recording medium 1 toward the photodetector 19.

Instead of the polarization beam splitter 13, a polarization hologram element which transmits a light having one polarization of the blue light 10a emitted from the light source 10 without change and diffracts a light having the other polarization of the blue light 10a reflected by the recording medium 1 into a +first or −first order light may be used as the polarization-dependent light path changer. In this aspect, the light source 10, the photodetector 19, and the polarization hologram element are preferably formed into an optical module.

A light path changer which transmits and reflects incident light at a predetermined ratio, for example, a beam splitter or a hologram element, may be used instead of the polarization-dependent light path changer.

The wave plate 29 is a quarter wave plate for a wavelength (e.g., 405 nm) of the blue light 10a. It is understood that wave plates optimized for other wavelengths may be used.

In this case, a light having one linear polarization, for example, a P polarization, emitted from the light source 10 is transmitted by the polarization beam splitter 13 and then changed to a light having one circular polarization while passing through the wave plate 29. The light having one circular polarization is directed toward the recording medium 1. The light having one circular polarization is changed to a light having the other circular polarization while being reflected by the recording medium 1. The light having the other circular polarization is changed to a light having the other linear polarization, for example, an S polarization, while passing through the wave plate 29. The light having the other linear polarization is reflected by the polarization beam splitter 13 toward the photodetector 19.

The beam splitter 25 may be either a wavelength-selective beam splitter which transmits the blue light 10a and reflects the red light 20a or a beam splitter which transmits and reflects incident light at a predetermined ratio.

The compatible optical pickup of FIG. 1 further includes gratings 11 and 21, which diffract incident light and divides the same into at least three lights so that a tracking error signal (TES) can be detected using a 3-beam technique and/or a differential push-pull (DPP) technique. The gratings 11 and 21 are installed between the light source 10 and the polarization beam splitter 13 and between the hologram optical module 20 and the beam splitter 25, respectively. In FIG. 1, the grating 21 is installed separately from the hologram optical module 20 between the hologram optical module 20 and the light path changer. However, the grating 21 may be incorporated into the hologram optical module 20.

When the grating 11 is included in the optical pickup of FIG. 1, the photodetector 19 preferably includes a main photodetector and first and second sub-photodetectors in order to detect a TES using the 3-beam technique and/or the DPP technique. The main photodetector receives a main light of a light reflected by the recording medium 1, and the first and second sub-photodetectors are installed on both sides of the main photodetector and receive first and second sublights, respectively, of the light reflected by the recording medium 1. The main light is a zero order diffracted light transmitted straight by the grating 11, and the first and second sublights are lights±first order diffracted by the grating 11.

The main photodetector may be divided into at least four parts in an R direction, corresponding to the radial direction of the recording medium 1, so that a TES can be detected using a main push-pull (MPP) technique. In the MPP technique, a push-pull operation is performed using the main photodetector. When three photodetectors are arranged together, a photodetector which is in the middle of the arrangement is referred to as a main photodetector, and the other photodetectors are referred to as side photodetectors. Also, the main photodetector may be divided into at least two parts in a T direction corresponding to the tangential direction of the recording medium 1, so that a focusing error signal (FES) and/or a TES can be detected using an astigmatism technique and/or a differential phase detection (DPD) technique, respectively. In other words, the main photodetector may have an 8-division structure in which the main photodetector is divided into four parts in the R direction and two parts in the T direction.

Each of the first and second sub-photodetectors is preferably, but not required to be, divided into two parts in the R direction so that a TES can be detected using the DPP technique.

When an optical pickup is designed such that the red light 20a is diffracted into a zero order light and a first order light by the grating 21, the photodetector of the hologram optical module 20, has a division structure the same as or similar to that of the photodetector 19.

The compatible optical pickup of FIG. 1 further includes collimating lenses 15 and 23 between the light source 10 and the beam splitter 25 and between the hologram optical module 20 and the beam splitter 25, respectively. The collimating lens 15 collimates the divergent blue light 10a emitted from the light source 10. The collimating lens 23 collimates the divergent red light 20a emitted from the hologram optical module 20. An astigmatism lens 17 is further included between the polarization beam splitter 13 and the photodetector 19 and makes astigmatism occur in incident light so that a FES can be detected using the astigmatism technique. In FIG. 1, the polarization beam splitter 13 is of a cubic type. When the polarization beam splitter 13 is of a plate type, the astigmatism lens 17 is preferably, but not necessarily, inclined in a direction opposite to an inclination direction of the plate-type polarization beam splitter 13 so as to remove a comma aberration produced when light passes through the plate-type polarization beam splitter 13. In FIG. 1, reference numeral 27 denotes a reflection mirror for converting a path of the blue and red lights 10a and 20a emitted from the light source 10 and the hologram optical module 20, respectively.

To control the power of a blue light for recording information on and/or reproducing information from the high-density recording medium 1a, that is, a BD, the compatible optical pickup of FIG. 1 further includes a monitor photodetector 16 which receives a light of the blue light 10a emitted from the light source 10 that is reflected by the polarization beam splitter 13. To increase an efficiency of detection by the monitor photodetector 16, a condensing lens 14 is further included between the polarization beam splitter 13 and the monitor photodetector 16.

In an aspect of the present invention, the objective lens 35 is made most suitable for the high-density recording medium 1a, for example, a BD. For example, the objective lens 35 may have a numerical aperture of 0.85 for the blue light 10a with a 405 nm wavelength and is designed to be most suitable for a high-density recording medium with a thickness of about 0.1 mm.

When the high-density recording medium 1a has a plurality of recording layers in at least one side, for example, two recording layers, the objective lens is designed to be most suitable for about half a thickness of the two recording layers or a thickness of one of the two recording layers.

The thickness of a recording layer denotes a distance between a surface of a protective layer upon which light for recording and/or reproduction is incident and the recording layer. For example, if the high-density recording medium 1a has two recording layers, a thickness of a first recording layer L0 denotes a distance between the surface of the protective layer and the first recording layer L0. A thickness of a second recording layer L1 denotes a distance between the surface of the protective layer and the second recording layer L1. When a recording medium 1 has a plurality of recording layers, a thickness of the recording medium 1 applied as a design value of the objective lens 35 may denote a distance between the surface of the protective layer and one of the recording layers or a distance between the surface of the protective layer and a predetermined location between recording layers.

For example, when a BD has two recording layers L0 and L1 in at least one side that have thicknesses of 100 μm and 80 μm, respectively, the objective lens 35 may be designed to be most suitable for a 90 μm thickness of the BD.

Hence, when data is recorded in and/or reproduced from a recording layer of the multi-layered high-density recording medium 1a that has a thickness deviated from the design value of the objective lens 35, a spherical aberration caused due to a difference between the two thicknesses must be corrected.

In an aspect with such a spherical aberration, the compatible optical pickup of FIG. 1 includes a liquid crystal element 28 between the polarization beam splitter 13 and the wave plate 29. The liquid crystal element 28 can selectively correct a spherical aberration caused due to a difference between thicknesses of recording layers of the multi-layered high-density recording medium 1a so that data can be recorded in and/or reproduced from the multi-layered high-density recording medium 1a.

When the blue light 10a traveling from the polarization beam splitter 13 to the wave plate 29 has a P polarization, and the blue light 10a traveling in a direction opposite to the above direction has an S polarization, the liquid crystal element 28 is designed to correct the spherical aberration by changing a wavefront of the P-polarized blue light 10a received from the light source 10 as needed and to transmit the S-polarized blue light 1a received from the recording medium 1 without changing the wavefront.

When a recording layer in which data is to be recorded and/or reproduced has a thickness deviating from the design value of the objective lens 35, the liquid crystal element 28 performs an operation to compensate for a spherical aberration generated due to a difference between the thickness and the design value. At this time, the P-polarized blue light 10a passed through the polarization beam splitter 13 has a wavefront of a spherical aberration reverse to the to-be-compensated spherical aberration while passing through the liquid crystal element 28 and is changed to light with one circular polarization while passing through the wave plate 29. A blue light 10a having no spherical aberration and a single circular polarization is focused on the recording layer in which data is to be recorded. The blue light 10a with one circular polarization is changed to a blue light 10a with the other circular polarization while being reflected by the recording medium 1. The blue light 10a with the other circular polarization is changed to a light with an S polarization while passing back through the wave plate 29. The S-polarized light is re-transmitted by the liquid crystal 28 without change of a wavefront and is reflected by the polarization beam splitter 13 toward the photodetector 19.

As described above, a recording layer of the high-density recording medium 1a in and/or from which data is to be recorded has a thickness different from the design value of the objective lens 35, the liquid crystal element 28 performs the operation to compensate for a spherical aberration when blue light 10a is incident upon the high-density recording medium 1a. In other words, when the recording layer of the high-density recording medium 1a in and/or from which data is to be recorded has the same thickness as the design value of the objective lens 35, the liquid crystal element 28 does not operate to compensate for a spherical aberration. Also, when the red light 20a is incident on the low-density recording medium, and data is to be recorded in and/or reproduced from the low-density recording medium 1b, for example, a DVD, the liquid crystal element 28 does not perform the operation to compensate for a spherical aberration.

The selective compensation of a spherical aberration by the liquid crystal element 28 upon recording and/or reproduction of data in and/or from a high-density recording medium 1a (e.g., a BD) thinner than a DVD will now be described.

As described above, when the objective lens 35 has an effective numerical aperture of 0.85, the high density recording medium 1a should have a thickness of about 0.1 mm to repress a comma aberration generated due to the high numerical aperture of the objective lens 35.

When the high-density recording medium 1a has a small thickness of about 0.1 mm, and has two recording layers in at least one side, the objective lens 35, with a high numerical aperture of approximately 0.85, is designed to be most suitable for a thickness of one of the two recording layers or for a location in between the two recording layers. Upon recording and/or reproduction of data in and/or from the high-density recording medium 1a having a plurality of recording layers in at least one side, when there is a difference between a thickness of a recording layer in and/or from which data is to be recorded and the design value of the objective lens 35, a spherical aberration is generated, and the liquid crystal element 28 needs to be designed and driven to remove the spherical aberration.

For example, if the thicknesses of two recording layers L0 and L1 of a two-layered BD are 100 μm and 80 μm, respectively, and the objective lens 35 has a structure most suitable for a 90 μm thickness of the recording medium 1 (i.e., the design value of the objective lens 35), the liquid crystal element 28 must be designed to erase a spherical aberration upon recording and/or reproduction of data in and/or from each of the two recording layers L0 and L1.

Upon data recording and/or reproduction in and/or from the recording layer L0 with a 100 μm thickness, there is a thickness difference of 10 μm from the design value (i.e., 90 μm) of the objective lens, so a spherical aberration of $-0.1\ \lambda$ rms is generated. When the liquid crystal element 28 is designed and driven so that a reverse spherical aberration corresponding to $+0.1\ \lambda$ rms occurs in light passed through the liquid crystal element 28, the spherical aberration of $-0.1\ \lambda$ rms can be compensated for.

Upon data recording and/or reproduction in and/or from the recording layer L1 with an 80 μm thickness, there is a thickness difference of $-10$ μm from the design value (i.e., 90 μm) of the objective lens, so a spherical aberration of $+0.1\ A$ rms is generated. When the liquid crystal element 28 is designed and driven so that a reverse spherical aberration corresponding to $-0.1\ \lambda$ rms occurs in light passed through the liquid crystal element 28, the spherical aberration of $+0.1\ \lambda$ rms can be compensated for.

When one of the two recording layers L0 and L1 of the two-layered BD has the same thickness as the design value of the objective lens 35, the liquid crystal element 28 is driven to compensate for a spherical aberration only when data is recorded on and/or from the other recording layer.

As described above, when the liquid crystal element 28 generates a spherical aberration is reverse to a spherical aberration generated due to a difference between the thickness of the high-density recording medium 1a, which is smaller than that of a DVD, and the design value of the objective lens 35, the two spherical aberrations are offset, so that the spherical aberration generated due to the difference between the thickness of the high-density recording medium 1a and the design value of the objective lens 35 can be compensated for.

As described above, upon recording and/or reproduction of data in and/or from a multi-layered high-density recording medium 1a having a smaller thickness than a DVD, the liquid crystal element 28 compensates for a spherical aberration caused when a thickness of a recording layer in and/or from which data is to be recorded is different from the design value of the objective lens 35. However, this is just an example. In other words, although the thickness of the high-density recording medium 1a is determined to be 0.1 mm, for example, the high-density recording medium 1a may actually have a thickness deviating from the 0.1 mm thickness due to a manufacturing error or a thickness difference may exist over the surface of the high-density recording medium 1a. Even in these cases, the liquid crystal element 28 may be designed and driven to compensate for a spherical aberration.

In an aspect of the compatible optical pickup of FIG. 1, the objective lens 35 is preferably designed to be most suitable for the high-density recording medium 1a, and a difference between thicknesses of the high-density and low-density recording media 1a and 1b, for example, a BD and a DVD is compensated for by the hologram element 30.

Preferably, the hologram element 30 diffracts the blue light 10a received from the light source 10 into a zero order light and the red light 20a received from the hologram optical module 20 into a second order light.

Figure 2:
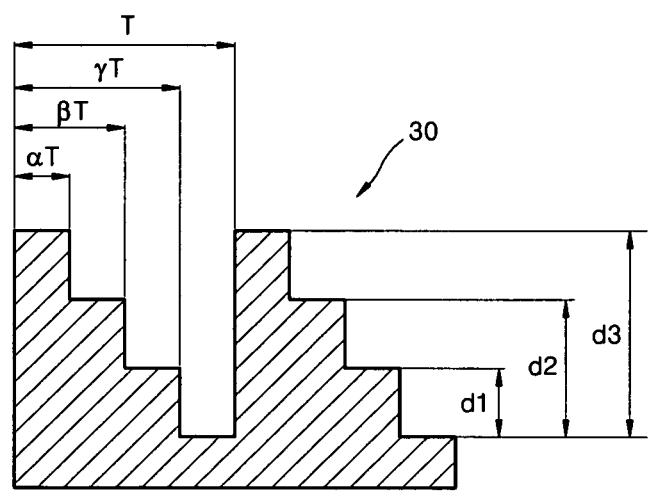
FIG. 2 is a partial cross-section of an example of a hologram pattern formed on the hologram element of FIG. 1.

FIG. 2 is a partial cross-section of an example of a hologram pattern formed on the hologram element 30. The hologram pattern of FIG. 2 has a four-step structure and is repeated at a regular pitch T. In FIG. 2, d3 denotes a maximum depth of the hologram pattern.

The stepped hologram patterns are formed concentrically on the hologram element 30 to have such a depth that the blue light 10a can be diffracted into a zero order light (i.e., transmitted straight) and the red light 20a can be diffracted into a second order light.

Figure 3:
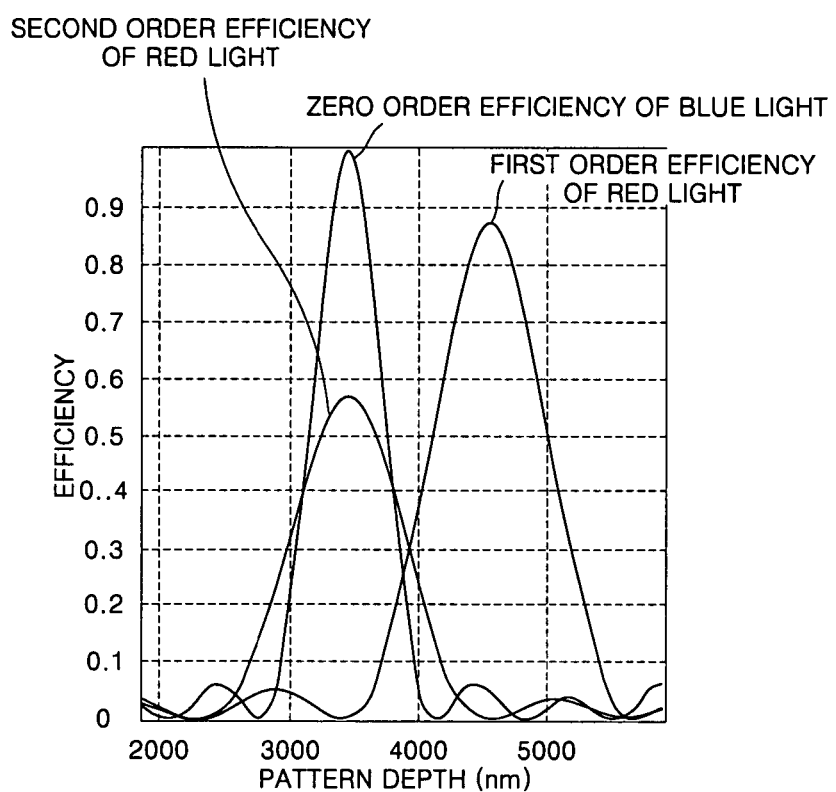
FIG. 3 is a graph of diffraction efficiencies of a blue light for blu-ray discs (BDs) and a red light for digital versatile discs (DVDs) versus a depth of a hologram pattern formed on the hologram element of FIG. 1.
Figure 4:
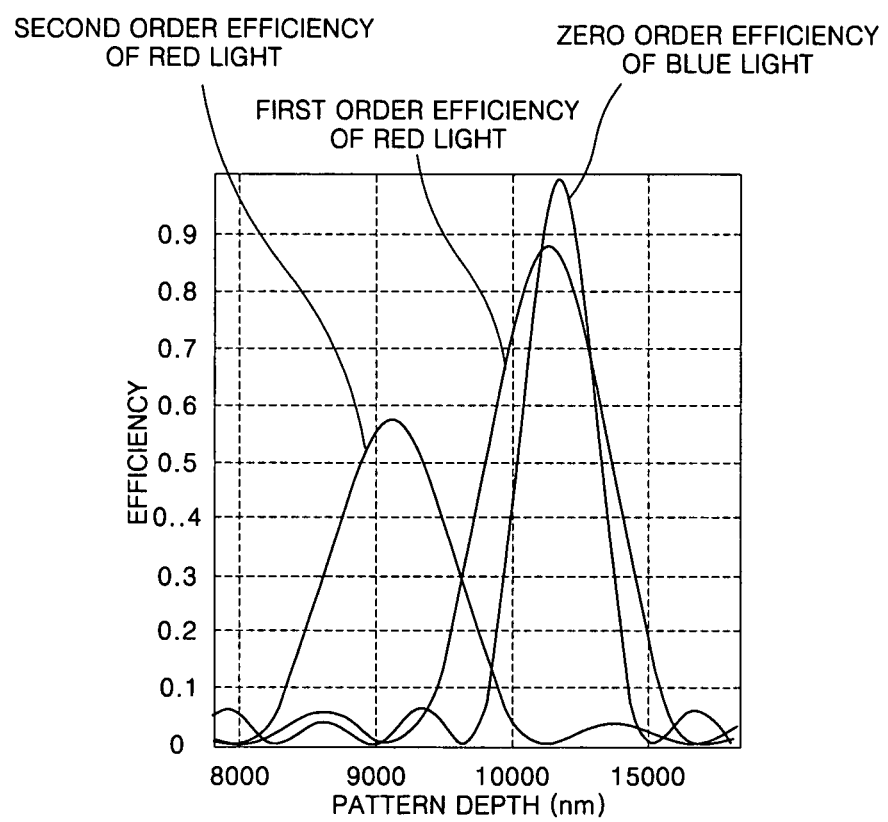
FIG. 4 is a graph of diffraction efficiencies of a blue light for BDs and a red light for DVDs versus a depth of a hologram pattern formed on the hologram element of FIG. 1.

FIGS. 3 and 4 are graphs of diffraction efficiencies of a blue light 10a for BDs and a red light 20a for DVDs versus depths of hologram patterns each having a four-step structure as in FIG. 2. Referring to FIG. 3, when the hologram pattern is shallow, a zero order diffraction efficiency of the blue light 10a for BDs has the same maximum peak position as that of a second order diffraction efficiency of the red light 20a for DVDs. Referring to FIG. 4, when the hologram pattern is deep, a zero order diffraction efficiency of the blue light 10a for BDs has the same maximum peak position as that of a first order diffraction efficiency of the red light 20a for DVDs.

In FIGS. 3 and 4, when the zero order diffraction efficiency of the blue light 10a for BDs is 100%, the first and second diffraction efficiencies of the red light 20a for DVDs are about 85% and about 57% of the maximum, respectively.

Table 1 shows a zero order diffraction efficiency of the blue light 10a for BDs and first and second diffraction efficiencies of the red light 20a for DVDs when depths of hologram patterns are 3.45 μm and 10.35 u m.

TABLE 1

| | | Zero order efficiency of light for BD | First order efficiency of light for DVD | Second order efficiency of light for DVD |
|---|---|---|---|---|
| Depth of hologram pattern | 3.45 μm | 100% | 0% | 57.3% |
| | 10.35 μm | 100% | 85% | 0.2% |

Even though a BD is prescribed in the BD specification to use a light with a 405 nm wavelength, light emitted from a semiconductor laser used for BDs has a wavelength in the range of 400 to 420 nm. Likewise, even though a DVD is prescribed in the DVD specification to use a light with a 650 nm wavelength, light emitted from a semiconductor laser used for DVDs has a wavelength in the range of 645 to 670 nm. The reason of the above facts is that it is difficult to manufacture semiconductor lasers that emit a blue light with an exact 405 nm wavelength and a red light with an exact 650 nm wavelength and that, when several semiconductor lasers are manufactured under an identical condition, the semiconductor layers may emit lights with slightly different wavelengths due to a manufacturing error or the like. Hence, a difference between the prescribed wavelength of a light used and the wavelength of light emitted from a semiconductor laser used as a light source must be considered upon the design of the optical system of an optical pickup.

Figure 5:
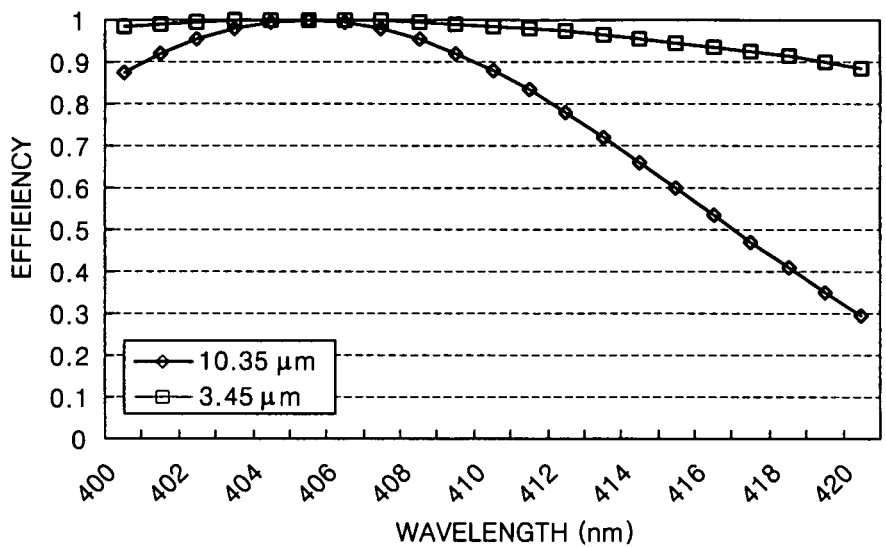
FIG. 5 is a graph indicating wavelength dependency of zero order diffraction efficiencies of hologram patterns with a 3.45 μm depth and a 10.35 μm depth versus a blue wavelength range.
Figure 6:
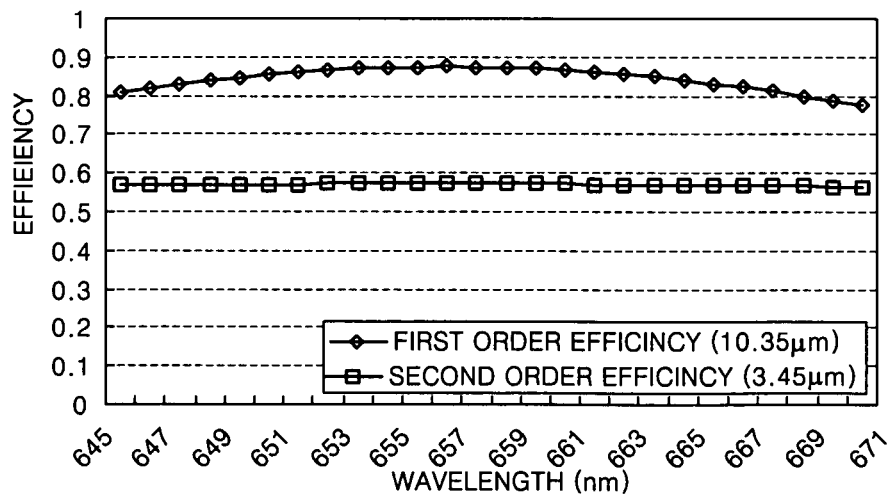
FIG. 6 is a graph indicating wavelength dependency of a second order diffraction efficiency of red light when a hologram pattern with a 3.45 μm depth is formed and wavelength dependency of a first order diffraction efficiency of red light when a hologram pattern with a 10.35 μm depth is formed.

FIG. 5 is a graph showing a wavelength dependency of zero order diffraction efficiencies of hologram patterns with depths of 3.45 μm and 10.35 μm upon a blue wavelength range. FIG. 6 is a graph showing wavelength dependencies of a second order diffraction efficiency of a red light 20a with a hologram pattern having a 3.45 μm depth and a first order diffraction efficiency of a red light 20a with a hologram pattern having a 10.35 μm depth upon a red wavelength range.

Table 2 shows diffraction efficiencies depending on the depths of the hologram patterns over the blue and red wavelength ranges in FIGS. 5 and 6.

TABLE 2

| | Wavelength range | Diffraction efficiency depending on depth of hologram pattern | |
|---|---|---|---|
| | | 3.45 μm | 10.35 μm |
| BD | 400~420 nm | 100~88.7% (zero order) | 100~29.5% (zero order) |
| DVD | 645~670 nm | 57.3~56.5% (second order) | 88.7~77.5% (first order) |

Referring to FIG. 5 and Table 2, when a depth of a hologram pattern is shallow, that is, 3.45 μm, a zero order diffraction efficiency does not vary significantly over a wavelength range (about 400 to 420 nm) of a blue light emitted from a semiconductor laser used as the BD light source 10. However, when the depth of the hologram pattern is deep, that is, 10.35 μm, the zero order diffraction efficiency shows more variance.

Referring to FIG. 6 and Table 2, when a depth of a hologram pattern is shallow, that is, 3.45 μm, a second order diffraction efficiency does not vary significantly over a wavelength range (about 645 to 670 nm) of a red light emitted from a semiconductor laser used as a DVD light source. However, when the depth of the hologram pattern is deep, that is, 10.35 μm, a first order diffraction efficiency shows more variance.

As shown in FIGS. 5 and 6 and Table 2, a diffraction efficiency corresponding to a light wavelength becomes insensitive as a hologram pattern becomes shallow. Hence, the hologram element 30 preferably secures an allowance depending on a wavelength of incident light by decreasing the depth of a hologram pattern as much as possible.

In other words, the use of a first order diffraction instead of a second order diffraction is good for an efficiency of the red light 20a for DVDs. However, in this aspect, a hologram pattern must be manufactured to have a large depth, so an efficiency of a zero-order diffracted light is very sensitive to a change of the wavelength of the blue light 10a for BDs. Consequently, although a diffraction efficiency of the red light 20a for DVDs is somewhat degraded, the second order diffraction, which is obtained by a shallow hologram pattern, is used to improve the wavelength dependency of the blue light 10a for BDs.

Hence, in an aspect of the present invention considering a change in the diffraction efficiency depending on a variation of the wavelength of light, a hologram pattern that can diffract the blue light 10a for BDs into a zero order light and the red light 20a for DVDs into a second order light is formed on the hologram element 30.

Figure 7:
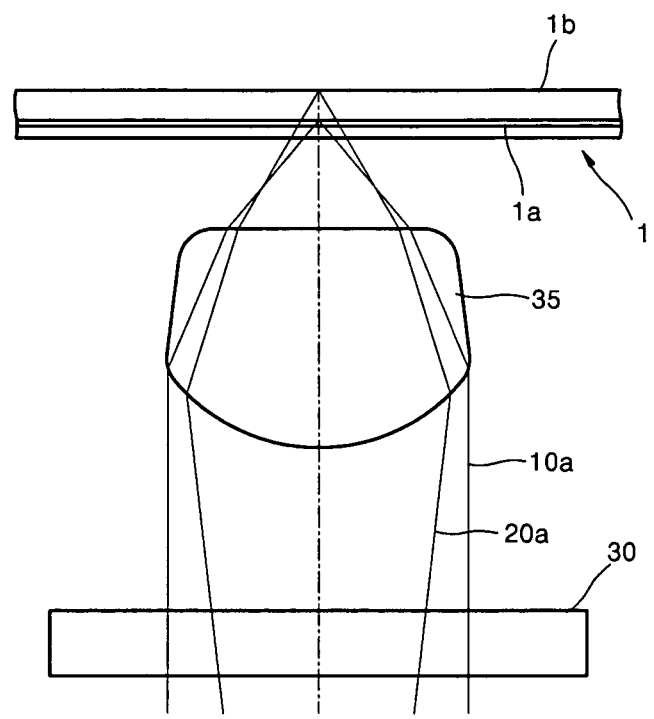
FIG. 7 illustrates paths of a blue light and a red light diffracted into zero and second orders, respectively, by a hologram element when the hologram element is disposed apart from an objective lens.

When the hologram element 30 is designed to diffract the blue light 10a for BDs into a zero order light and the red light 20a for DVDs into a second order light as described above, paths of the blue and red lights 10a and 20a diffracted into zero and second order lights, respectively, by the hologram 30 are as illustrated in FIG. 7.

In the compatible optical pickup of FIGS. 1 and 7, the hologram element 30 is installed separately from the objective lens 35.

Figure 8:
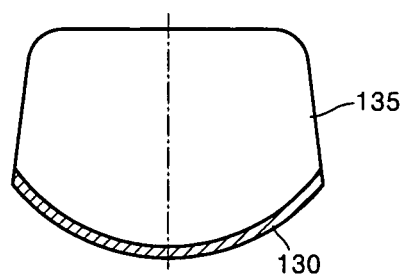
FIG. 8 is a schematic diagram of a focusing unit according to another embodiment of the present invention.

Alternatively, the hologram element 30 may be combined with the objective lens 35 to form a single body. In other words, the hologram element 30 may be attached to the objective lens 35. Alternatively, as shown in FIG. 8, a hologram pattern 130 may be formed directly on a lens surface of an objective lens 135, which is optimized for high-density recording media. The hologram pattern 130 diffracts a short wavelength light into a zero order light and a long wavelength light into a second order light. The objective lens 135 has substantially the same optical structure as the objective lens 35 except that the hologram pattern 130 is formed on one lens surface.

In FIG. 1, the hologram element 30, the liquid crystal element 28, and the wave plate 29 are formed in a single body. The objective lens 35 is driven in focusing and tracking directions by an actuator (not shown), and the hologram element 30, the liquid crystal element 28, and the wave plate 29 are mounted together on the actuator. The hologram element 30, the liquid crystal element 28, and the wave plate 29 may be disposed separately from one another. Alternatively, the liquid crystal element 28 and the wave plate 29 may be separated from each other.

Table 3 shows a design example of the focusing unit illustrated in FIGS. 1 and 7, which can compatibly use a BD and a DVD and having the objective lens 35 and the hologram element 30 which are separated from each other.

As shown in Table 4, data mentioned in Table 3 represents an aspect where the objective lens 35 is designed to have a numerical aperture (NA) of 0.85, a focal length (f) of 1.76 mm, and a working distance of 0.5 mm to focus the blue light 10a with a wavelength of 405 nm on a BD with a thickness of 0.1 mm and to have an NA of 0.6, a focal length (f) of 1.84 mm, and an operating distance of 0.5 mm to focus the red light 20a with a wavelength of 650 nm on a DVD.

TABLE 3

| Surface | Radius of curvature | Thickness | Glass |
|---|---|---|---|
| Object surface | Infinity | Infinity | |
| S1 | Infinity | Infinity | |
| S2 (surface on which hologram pattern is formed) | Infinity | 0.50000 | Silica |
| | Second order diffraction of light with 650 nm wavelength | | |
| | C1: 1.9674E−02 C2: 2.5773E−03 | | |
| | C3: 1.5501E−03 | | |
| | C5: 3.3370E−03 C6: −6.2022E−03 | | |
| | C7: 2.3060E−03 | | |
| S3 | Infinity | 1.600000 | |
| S4 (asphere 1) | 1.39427 | 2.170000 | avc81 |
| | K: −0.507896 | | |
| | A: 0.487024E−02 B: −.235023E−02 | | |
| | C: 0.128856E−02 | | |
| | D: −.682789E−03 E: −.166206E−03 | | |
| | F: 0.682382E−04 | | |
| S5 (asphere 2) | −23.61004 | 0.500000 | |
| | K: −27167.82179 | | |
| | A: −.924381E−02 E: 0.157090E−01 | | |

TABLE 3-continued

| Surface | Radius of curvature | Thickness | Glass |
|---|---|---|---|
|  | C: 0.639951E−02 |  |  |
|  | D: −.625849E−02 |  |  |
| S6 | Infinity | 0.600000 | 'pc' |
| S7 | Infinity | 0.000000 |  |

The reason why an interval between surfaces S7 and S8 is 0.6 mm in Table 3 is that a second order light into which the red light 20a with a 650 nm wavelength is diffracted by the hologram element 30 is focused on a DVD with a 0.6 mm thickness via the objective lens 35. When the objective lens 35 receives the blue light 10a with a 405 nm wavelength, the interval between the surfaces S7 and S8 is about 0.1 mm.

TABLE 4

|  |  | BD | DVD |
|---|---|---|---|
| Objective lens | Numerical aperture (NA) | 0.85 | 0.6 |
|  | Focal length (f) | 1.76 mm | 1.84 mm |
|  | Working distance | 0.5 mm | 0.5 mm |
|  | Wavelength of light | 405 nm | 650 nm |

In Table 3, the surface S2 denotes a surface of the hologram element 30 on which a hologram pattern formed to diffract light with a 650 nm wavelength into a second order light is formed, and C1, C2, C3, C5, C6 and C7 denote hologram coefficients. In surfaces S4 and S5 of Table 3, K denotes a conical coefficient in an expression of an asphere, and A, B, C, D, E, and F denote aspherical coefficients.

In a rotationally symmetric form, hologram optical element (HOE) phase coefficients can be obtained by Equation 3:

$$\varphi = \frac{2\pi}{\lambda_0} \sum_n C_n r^{2n} \quad (3)$$

wherein C denotes a hologram coefficient, r denotes a radius of curvature, $\lambda_0$ denotes a wavelength, and $\phi$ denotes a phase.

A formula of a diffraction efficiency of a hologram can be expressed as in Equation 4:

$$T_m = \frac{1}{T}\int_0^{\alpha T} e^{\frac{2\pi i m}{T}x} dx + \frac{1}{T}\int_{\alpha T}^{\beta T} e^{\frac{2\pi i m}{T}x} e^{\frac{2\pi i (n_1 - n_0) d_1}{\lambda}} dx + \frac{1}{T}\int_{\beta T}^{\gamma T} e^{\frac{2\pi i m}{T}x} e^{\frac{2\pi i (n_1 - n_0) d_2}{\lambda}} dx + \frac{1}{T}\int_{\gamma T}^{T} e^{\frac{2\pi i m}{T}x} e^{\frac{2\pi i (n_1 - n_0) d_3}{\lambda}} dx \quad (4)$$

$$\eta_m = [T_m]^2$$

wherein η denotes an efficiency, m denotes an order, and λ denotes a wavelength used. As illustrated in FIG. 2, T denotes the pitch of a hologram pattern, αT, βT, and γT denote widths of steps, and d1, d2, and d3 denote step heights between the first step and each of second, third, and fourth steps, respectively. Distance d3 is a maximum depth of the hologram pattern.

Table 3 shows an example of the objective lens 35 which has two aspherical lens surfaces.

Given that a depth of an asphere of a lens calculated from the apex of the asphere is z, z is given by Equation 5:

$$z = \frac{ch^2}{1 + \sqrt{1 - (1+K)c^2 h^2}} + Ah^4 + Bh^6 + Ch^8 + Dh^{10} + Eh^{12} + Fh^{14} + Gh^{16} + Hh^{18} + Jh^{20} \quad (5)$$

wherein h denotes a height from an optical axis, c denotes a curvature, K denotes a conic coefficient, and A through J denote aspherical coefficients.

When the objective lens 35 and the hologram element 30 are designed with reference to the data of Tables 3 and 4, the focusing unit generates an aberration of about 0.0049 λ rms when a BD is used, and an aberration of about 0.0031 λ rms when a DVD is used.

Considering that a Marechal criterion typically allowed in an optical system used in an optical pickup is 0.070λ rms, the compatible optical pickup according to the present invention has an optical system which generates a sufficiently allowable aberration.

Hence, the compatible optical pickup according to embodiments of the present invention having such an optical system can compatibly adopt the high-density recording media 1a, for example, BDs, and the low-density recording media 1b, for example, DVDs.

Figure 9:
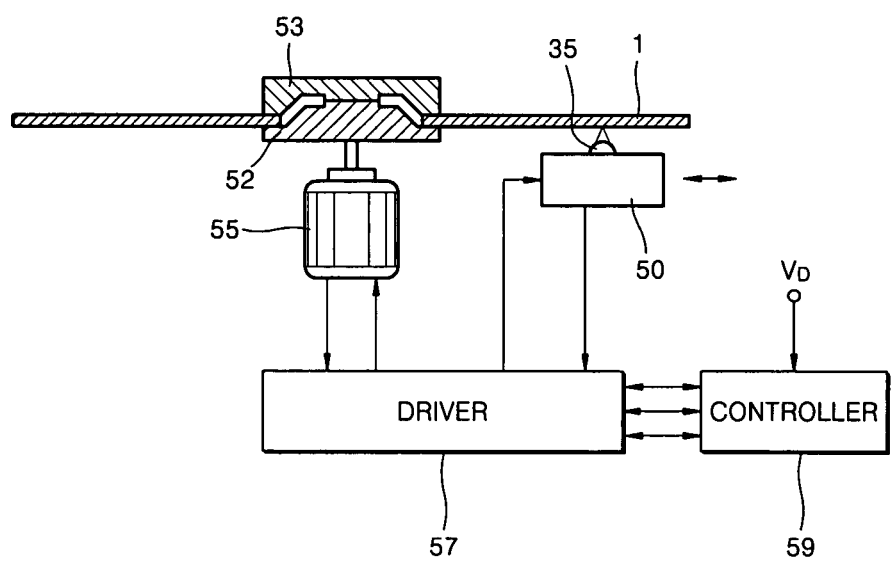
FIG. 9 is a schematic diagram of an optical recording and/or reproducing apparatus adopting the compatible optical pickup according to an embodiment of the present invention.

FIG. 9 is a schematic diagram of an optical recording and/or reproducing apparatus adopting the compatible optical pickup of FIG. 1, according to an embodiment of the present invention. Referring to FIG. 9, the optical recording and/or reproducing apparatus includes a spindle motor 55 for rotating the recording medium 1, which is an optical information storage medium, the compatible optical pickup 50 which is installed to be movable in a radial direction of the recording medium 1 and records data on and/or reproduces data from the recording medium 1, a driver 57 for driving the spindle motor 55 and the compatible optical pickup 50, and a controller 59 for controlling a focusing and tracking servo and the like of the compatible optical pickup 50. Reference numerical 52 denotes a turntable, and reference numeral 53 denotes a clamp for chucking the recording medium 1.

The various optical pickups according to the embodiments of the present invention as described above are used as the compatible optical pickup 50.

Light reflected by the recording medium 1 is detected by the photodetector 19 of the compatible optical pickup 50 and changed to an electrical signal by photoelectric transformation. The electrical signal passes through the driver 57 and is input to the controller 59. The driver 57 controls a rotational speed of the spindle motor 55, amplifies a received signal, and drives the compatible optical pickup 50. The controller 59 transmits a focusing and tracking servo command adjusted based on the electrical signal received from the driver 57 to the driver 57 so that the compatible optical pickup 50 can perform tracking and focusing operations.

In the optical recording and/or reproducing apparatus, the adopted compatible optical pickup according to an aspect of the present invention uses the single objective lens 35, so an optical system for the high-density recording medium 1a and an optical system for the low-density recording medium 1b are formed into a single optical system. Thus, the complexity of the optical system of the compatible optical pickup is minimized.

Also, since the adopted compatible optical pickup includes a hologram element which diffracts a short wavelength light for high-density recording media into a zero order light and a long wavelength light for low-density recording media into a second order light, the adopted compatible optical pickup can record data in and/or reproduce data from both a high-density recording medium, which uses a blue light, and a low-density recording medium (e.g., a DVD) having a lower recording density than the high-density recording medium by using a single objective lens which is optimized for the high-density recording media.

Further, the adopted compatible optical pickup uses the single objective lens 35, so an optical system for the high-density recording medium 1*a* and an optical system for the low-density recording medium 1*b* are formed into a single optical system. Thus, the optical system of the optical recording and/or reproducing apparatus is easier to manufacture.

Although a few embodiments of the present invention have been shown and described, it would be appreciated by those skilled in the art that changes may be made in these embodiments without departing from the principles and spirit of the invention, the scope of which is defined in the claims and their equivalents.

What is claimed is:

1. A compatible optical pickup, comprising:
   an optical unit emitting a short wavelength light for a high-density recording medium and a long wavelength light for a low-density recording medium, directing the short and long wavelength light to a corresponding one of the high-density recording medium and the low-density recording medium, receiving lights reflected by the corresponding recording medium, and detecting an information reproduction signal and/or an error signal from the received lights; and
   a focusing unit focusing the short and long wavelength light received from the optical unit to form a light spot on a recording surface of the corresponding recording medium and diffracting the short wavelength light into a zero order light and the long wavelength light into a second order light to be used for recording and/or reproduction so that the high-density recording medium and the low-density recording medium having different thicknesses are usable with the compatible optical pickup.

2. The compatible optical pickup of claim 1, wherein the focusing unit comprises:
   an objective lens optimized for the high-density recording medium, focusing the short and long wavelength light received from the optical unit to form the light spot on the recording surface of the corresponding recording medium; and
   a hologram element diffracting the short wavelength light into the zero order light and the long wavelength light into the second order light.

3. The compatible optical pickup of claim 2, wherein the hologram element is combined with an objective lens into a single body.

4. The compatible optical pickup of claim 1, wherein the focusing unit comprises:
   an objective lens optimized for the high-density recording medium, the objective lens having a hologram pattern formed on one lens surface to diffract the short wavelength light received from the optical unit into the zero order light and the long wavelength light into the second order light, and focusing the short and long wavelength light received from the optical unit to form the light spot on the recording surface of the corresponding recording medium.

5. The compatible optical pickup of claim 1, wherein the short wavelength light is a blue light, and the long wavelength light is a red light.

6. The compatible optical pickup of claim 5, wherein the high-density recording medium includes a blu-ray disc, and the low-density recording medium includes a digital versatile disc.

7. The compatible optical pickup of claim 5, wherein the blue light has a wavelength ranging from 400 to 420 nm, and the red light has a wavelength ranging from 645 to 670 nm.

8. The compatible optical pickup of claim 5, wherein the optical unit comprises:
   a light source emitting the blue light;
   a photodetector receiving the blue light reflected by the corresponding recording medium and detecting the information reproduction signal and/or the error signal corresponding to the high-density recording medium from the received blue light; and
   a hologram optical module emitting the red light, receiving the red light reflected by the recording medium, and detecting the information reproduction signal and/or the error signal corresponding to the low-density recording medium from the received red light.

9. The compatible optical pickup of claim 5, wherein the optical unit further comprises:
   a polarization-dependent light path changer transmitting or reflecting the blue light according to a polarization state; and
   a wave plate changing a polarization of an incident light.

10. The compatible optical pickup of claim 9, further comprising a liquid crystal element installed on a light path between the polarization-dependent light path changer and the wave plate, compensating for a spherical aberration generated due to a thickness difference when data is recorded on or reproduced from the high-density recording medium.

11. The compatible optical pickup of claim 10, wherein:
    the high-density recording medium has a plurality of recording layers in at least one side, and
    when one of the recording layers of the high-density recording medium having a thickness deviating from a design value is recorded or reproduced, the liquid crystal element operates to compensate for the spherical aberration caused due to the thickness difference.

12. An optical recording and/or reproducing apparatus for recording information on and/or reproducing information from one of a high-density recording medium and a low-density recording medium by using an optical pickup movable in a radial direction of a recording medium, the optical pickup comprising:
    an optical unit emitting a short wavelength light for the high-density recording medium and a long wavelength light for the low-density recording medium, directing the short and long wavelength light to a corresponding one of the high-density recording medium and the low-density recording medium, receiving lights reflected by the corresponding recording medium, and detecting an information reproduction signal and/or an error signal from the received lights; and
    a focusing unit focusing the light received from the optical unit to form a light spot on a recording surface of the corresponding recording medium and diffracting the short wavelength light into a zero order light and the long wavelength light into a second order light to be used as effective light for recording and/or reproduction so that the high-density recording medium and the low-density recording medium having different thicknesses are usable by the apparatus.

13. The optical recording and/or reproducing apparatus of claim 12, wherein the focusing unit comprises:
   an objective lens optimized for the high-density recording medium, focusing the light received from the optical unit to form the light spot on the recording surface of the corresponding recording medium; and
   a hologram element diffracting the short wavelength light into the zero order light and the long wavelength light into the second order light.

14. The optical recording and/or reproducing apparatus of claim 13, wherein the hologram element is combined with an objective lens into a single body.

15. The optical recording and/or reproducing apparatus of claim 12, wherein the focusing unit comprises:
   an objective lens optimized for the high-density recording medium, the objective lens having a hologram pattern formed on one lens surface to diffract the short wavelength light received from the optical unit into the zero order light and the long wavelength light into the second order light, and focusing the light received from the optical unit to form the light spot on the recording surface of the corresponding recording medium.

16. The optical recording and/or reproducing apparatus of claim 12, wherein the short wavelength light is a blue light, and the long wavelength light is a red light.

17. The optical recording and/or reproducing apparatus of claim 16, wherein the high-density recording medium includes a blu-ray disc, and the low-density recording medium includes a digital versatile disc.

18. The optical recording and/or reproducing apparatus of claim 16, wherein the blue light has a wavelength ranging from 400 to 420 nm, and the red light has a wavelength ranging from 645 to 670 nm.

19. The optical recording and/or reproducing apparatus of claim 16, wherein the optical unit comprises:
   a light source emitting the blue light;
   a photodetector receiving the blue light reflected by the corresponding recording medium and detecting the information reproduction signal and/or the error signal corresponding to the high-density recording medium from the received blue light; and
   a hologram optical module emitting the red light, receiving the red light reflected by the recording medium, and detecting information reproduction signal and/or the error signal corresponding to the low-density recording medium from the received red light.

20. The optical recording and/or reproducing apparatus of claim 16, wherein the optical unit further comprises:
   a polarization-dependent light path changer transmitting or reflecting the blue light according to a polarization state; and
   a wave plate changing a polarization of an incident light.

21. The optical recording and/or reproducing apparatus of claim 20, further comprising a liquid crystal element installed on a light path between the polarization-dependent light path changer and the wave plate, compensating for a spherical aberration generated due to a thickness difference when data is recorded on or reproduced from the high-density recording medium.

22. The optical recording and/or reproducing apparatus of claim 21, wherein:
   the high-density recording medium has a plurality of recording layers in at least one side, and
   when one of the recording layers of the high-density recording medium having a thickness deviating from a design value is recorded or reproduced, the liquid crystal element operates to compensate for the spherical aberration caused due to the thickness difference.

23. A compatible optical pickup recording and/or reproducing data on/from at least one of a first density and a second density type of information storage media, comprising:
   a first laser diode emitting a first beam to the first density type of information storage medium;
   a second laser diode emitting a second beam to the second density type of information storage medium;
   a single objective lens which focuses the first beam and the second beam on a recording surface of the at least one of the first density information storage medium and the second density information storage medium;
   a diffraction element selectively diffracting the first and the second beams into at least one of a zero order beam, and a second order beam depending on which of the at least one of the first density information storage medium and the second density information storage medium is to be accessed;
   a photo-detector selectively receiving the at least one of a zero order beam, and a second order beam of the first beam and the at least one of a zero order beam, and a second order beam of the second beam at different detecting portions to record and/or reproduce the data and error detection and compensation;
   a polarization-dependent light path changer transmitting or reflecting the first beam according to a polarization state;
   a wave plate changing a polarization of an incident light; and
   a liquid crystal element installed on a light path between the polarization-dependent light path changer and the wave plate, selectively compensating for a spherical aberration generated due to a thickness variance when the data is recorded on and/or reproduced from recording layers of the first density recording medium, but not the second density recording medium.

24. A method of recording and/or reproducing data with a compatible optical disc player, comprising:
   emitting a first beam to a first type of optical disc;
   emitting a second beam to a second type of optical disc;
   selectively splitting the first and the second laser beams into one of a zero order and a second order beam depending on which optical disc is to be accessed; and
   selectively receiving the zero order beams of the first beam and the second order beams of the second laser beam at different detecting portions to record and/or reproduce data and for error detection and compensation, wherein the detecting portions comprise a photodetector and a hologram optical module.

25. The method of claim 24, wherein the selectively splitting the first and second laser beams comprises maximizing the zero order efficiency of the first laser beam.

26. The method of claim 24, further comprising:
   compensating selectively for a spherical aberration corresponding to one of the first type of optical disc and the second type of the optical disc, but not the other when the data is recorded on and/or reproduced from recording layers of the corresponding one of the first type of optical disc and the second type of the optical disc.

* * * * *